(12) United States Patent
Liu et al.

(10) Patent No.: US 11,757,082 B2
(45) Date of Patent: Sep. 12, 2023

(54) METHOD FOR FABRICATING AN ANODE FOR A LITHIUM BATTERY CELL

(71) Applicant: GM GLOBAL TECHNOLOGY OPERATIONS LLC, Detroit, MI (US)

(72) Inventors: Jin Liu, Novi, MI (US); Jiazhi Hu, Troy, MI (US); Raffaello Ardanese, Bloomfield Hills, MI (US); Ryan C. Sekol, Grosse Pointe Woods, MI (US); Lei Wang, Rochester Hills, MI (US); Michael P. Balogh, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 252 days.

(21) Appl. No.: 17/179,543

(22) Filed: Feb. 19, 2021

(65) Prior Publication Data

US 2022/0271268 A1    Aug. 25, 2022

(51) Int. Cl.
*H01M 4/04* (2006.01)
*H01M 10/0568* (2010.01)
*H01M 10/0569* (2010.01)
*H01M 10/0565* (2010.01)

(52) U.S. Cl.
CPC ..... *H01M 4/0416* (2013.01); *H01M 10/0565* (2013.01); *H01M 10/0568* (2013.01); *H01M 10/0569* (2013.01)

(58) Field of Classification Search
CPC .. H01M 4/04; H01M 4/0416; H01M 10/0525; H01M 10/0565; H01M 10/0568; H01M 10/0569
See application file for complete search history.

(56) References Cited

U.S. PATENT DOCUMENTS

| | | | |
|---|---|---|---|
| 2013/0288130 A1* | 10/2013 | Sheem | H01M 4/366 29/623.5 |
| 2013/0327648 A1* | 12/2013 | Grant | C25D 3/665 205/59 |
| 2016/0172706 A1* | 6/2016 | Xiao | H01M 10/052 429/189 |
| 2020/0119339 A1 | 4/2020 | Halalay et al. | |
| 2020/0227728 A1 | 7/2020 | Huang et al. | |
| 2020/0321603 A1 | 10/2020 | Xiao | |
| 2020/0321617 A1 | 10/2020 | Xiao | |
| 2021/0020899 A1 | 1/2021 | Halalay et al. | |
| 2021/0020912 A1 | 1/2021 | Xiao et al. | |
| 2021/0036320 A1 | 2/2021 | Xiong et al. | |

* cited by examiner

*Primary Examiner* — Kenneth J Douyette
(74) *Attorney, Agent, or Firm* — Quinn IP Law

(57) ABSTRACT

A method for fabricating an anode for a lithium ion battery cell is described and includes forming a solid electrolyte interface (SEI) layer on a raw anode prior to assembly into a battery cell by applying a first SEI-generating electrolyte to the raw anode to form a first intermediate anode, applying a second SEI-generating electrolyte to the first intermediate anode to form a second intermediate anode, and applying a third SEI-generating electrolyte to the second intermediate anode to form a cell anode, wherein the cell anode includes the raw anode having the SEI layer. Thus, a cell anode is formed by sequentially applying SEI-generating electrolytes to a raw anode to form the cell anode with an SEI layer, and a lithium ion battery cell is formed by assembling the cell anode into a cell pack, with a cathode, and a separator, and adding a cell electrolyte prior to sealing.

20 Claims, 3 Drawing Sheets

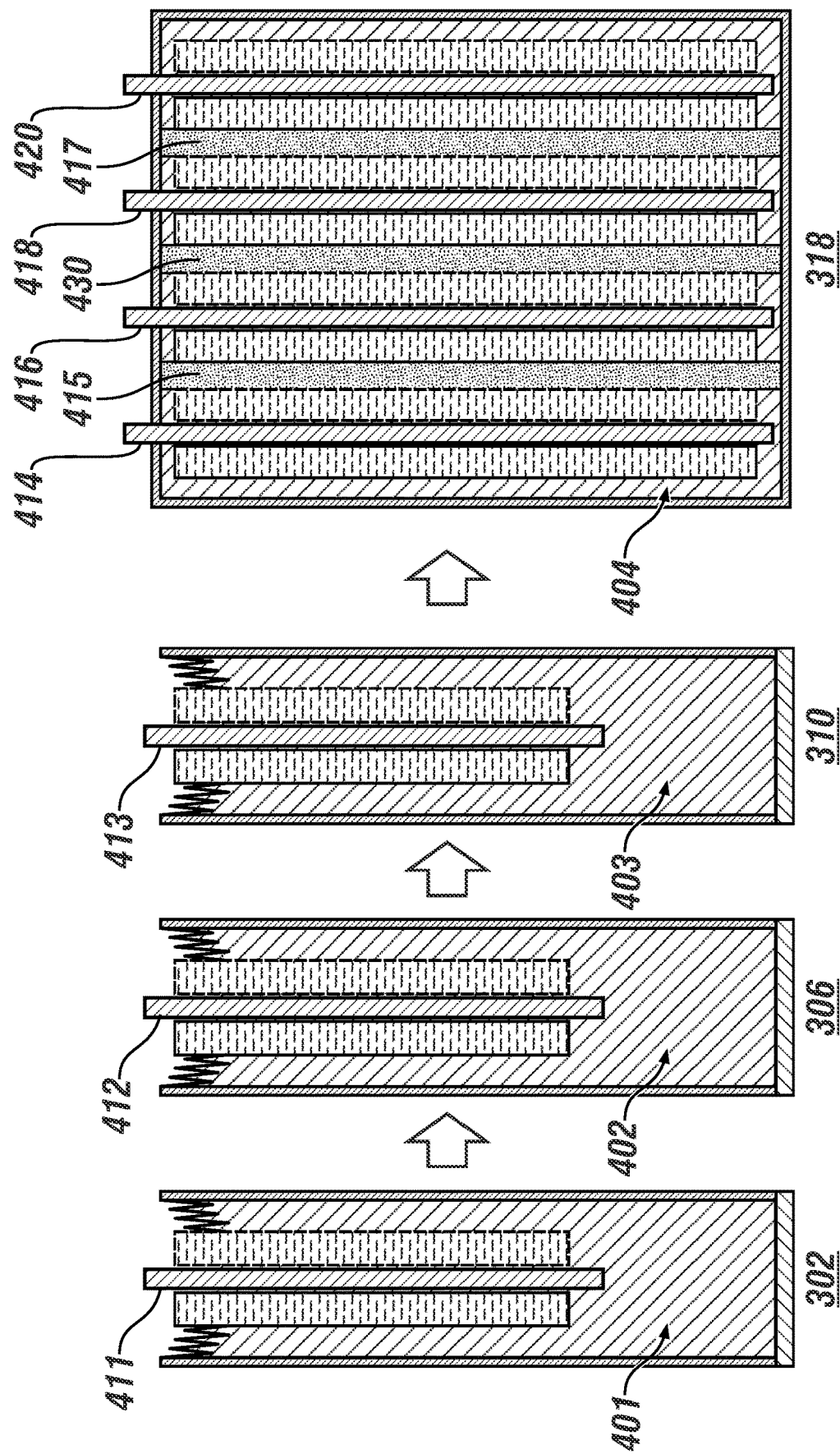

METHOD FOR FABRICATING AN ANODE FOR A LITHIUM BATTERY CELL

INTRODUCTION

Lithium ion batteries are a class of rechargeable batteries in which lithium ions move between a negative electrode and a positive electrode. Liquid, solid, and polymer electrolytes can facilitate the movement of lithium ions between the anode and cathode. Lithium-ion batteries have applications in handheld personal communication devices and automotive systems due to their high energy density and ability to undergo successive charge and discharge cycles. Large volume changes and high reactivity of Li metal electrode can lead to "mossy" lithium structures and/or lithium dendrite growth, which can reduce the cycle efficiency and applications of such Li-ion batteries.

SUMMARY

Provided herein are methods for forming anodes for lithium ion battery cells that have solid electrolyte interface (SEI) layers that are formed prior to assembling the anode into the battery cell. The SEI layers described herein suppress or prevent the growth of Li dendrites and/or "mossy" structures during battery cycling, and also exhibit flexible properties which lend mechanical protection to the lithium anodes and appurtenant battery cell structures. Further, forming of the SEI layers may create hydrophobic electrode intermediary products, which allow the same to be transported and/or stored in non-inert environments between manufacturing steps.

The concepts described herein provide a method for fabricating an anode for a lithium ion battery cell. The method includes forming a solid electrolyte interface (SEI) layer on a raw anode prior to assembly into a battery cell by applying a first SEI-generating electrolyte to the raw anode to form a first intermediate anode, applying a second SEI-generating electrolyte to the first intermediate anode to form a second intermediate anode, and applying a third SEI-generating electrolyte to the second intermediate anode to form a cell anode, wherein the cell anode includes the raw anode having the SEI layer. The raw anode includes a metallic strip having an electroactive material deposited on at least one side.

An aspect of the disclosure includes fabricating a cell anode by sequentially applying one or different SEI-generating electrolytes to a raw anode to form a cell anode having a solid electrolyte interface (SEI) layer, and fabricating a lithium ion battery cell by assembling the cell anode into a cell pack, wherein the cell pack includes a cathode, and a separator, and adding a cell electrolyte to the cell pack prior to sealing.

Another aspect of the disclosure includes applying the first SEI-generating electrolyte to the raw anode by applying a first non-aqueous liquid electrolyte solution to the raw anode that includes a first lithium salt that is dissolved in an organic solvent.

Another aspect of the disclosure includes applying the first SEI-generating electrolyte to the raw anode by applying a first non-aqueous liquid electrolyte solution to the raw anode that includes a first mixture of lithium salts that are dissolved in an organic solvent.

Another aspect of the disclosure includes applying the second SEI-generating electrolyte to the first intermediate anode by applying a second non-aqueous liquid electrolyte solution to the first intermediate anode that includes a second lithium salt that is dissolved in an organic solvent.

Another aspect of the disclosure includes applying the SEI-generating electrolyte to the first intermediate anode by applying a second non-aqueous liquid electrolyte solution to the first intermediate anode that includes a second mixture of lithium salts that are dissolved in an organic solvent.

Another aspect of the disclosure includes applying the third SEI-generating electrolyte to the second intermediate anode by applying a third non-aqueous liquid electrolyte solution to the second intermediate anode that includes a third lithium salt that is dissolved in an organic solvent.

Another aspect of the disclosure includes applying the third SEI-generating electrolyte to the second intermediate anode by applying a third non-aqueous liquid electrolyte solution to the second intermediate anode that includes a third mixture of lithium salts that are dissolved in an organic solvent.

Another aspect of the disclosure includes the first, second and third SEI-generating electrolytes being a non-aqueous liquid electrolyte solution that includes a lithium salt that is dissolved in an organic solvent, wherein the lithium salt includes one of or a mixture of lithium hexafluorophosphate ($LiPF_6$); lithium perchlorate ($LiClO_4$); lithium tetrachloroaluminate ($LiAlCl_4$); lithium bis (oxalate)borate ($LiB(C_2O_4)_2$) (LiBOB); lithium nitrate ($LiNO_3$), lithium bis (trifluoromethanesulfonimide) (LITFSI) ($LiN(CF3SO2)2$); lithium fluorosulfonylimide ($LiN(FSO2)2$) (LIFSI).

Another aspect of the disclosure includes executing a first drying step subsequent to applying the first SEI-generating electrolyte to the raw anode.

Another aspect of the disclosure includes executing a second drying step subsequent to applying the second SEI-generating electrolyte to the first intermediate anode.

Another aspect of the disclosure includes executing a third drying step subsequent to applying the third SEI-generating electrolyte to the second intermediate anode.

Another aspect of the disclosure includes assembling the cell anode into a cell pack, wherein the cell pack includes a cathode, and a separator; and adding a cell electrolyte to the cell pack prior to sealing, wherein the cell electrolyte has a chemical composition that differs from the first, second, and third SEI-generating electrolytes.

Another aspect of the disclosure includes evaluating SEI layer on the cell anode prior to assembling the cell anode into a cell pack; and assembling the cell anode into the cell pack only when the SEI layer on the cell anode achieves a minimum standard.

Expected benefits of the utilization of this process include avoiding electrodes from being partially-wetted or homogeneous reaction kinetics that may occur during SEI formation inside cells, with associated lithium plating, electrolyte decomposition and gassing, and other issues affecting battery cell quality.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which:

FIGS. 3 and 4 schematically illustrate elements of an SEI forming process for fabricating a cell anode for the battery cell described with reference to FIGS. 1 and 2, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

An electrochemical cell, i.e., a battery cell, includes an anode and a cathode, an electrolyte, and a separator that are assembled in a container. Electrochemical cells can be electrically connected in a stack to increase overall output, such as in a lithium-ion battery pack.

Lithium-ion electrochemical cells operate by reversibly passing lithium ions between the anode and the cathode, with the separator and an electrolyte disposed therebetween. The electrolyte is employed to conduct lithium ions and may be in liquid, gel, or solid form. Lithium ions move from the cathode to the anode during charging of the battery, and in the opposite direction when discharging the battery.

The anode and cathode are each electrically connected to a current collector, which may be a metal such as copper for the anode and aluminum for the cathode. During battery usage, the current collectors associated with the anode and the cathode are connected by an external circuit that allows current generated by electrons to pass between the negative and positive electrodes to compensate for transport of lithium ions.

Electrodes can be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating anodes and cathodes with separators disposed therebetween.

Figure 1:
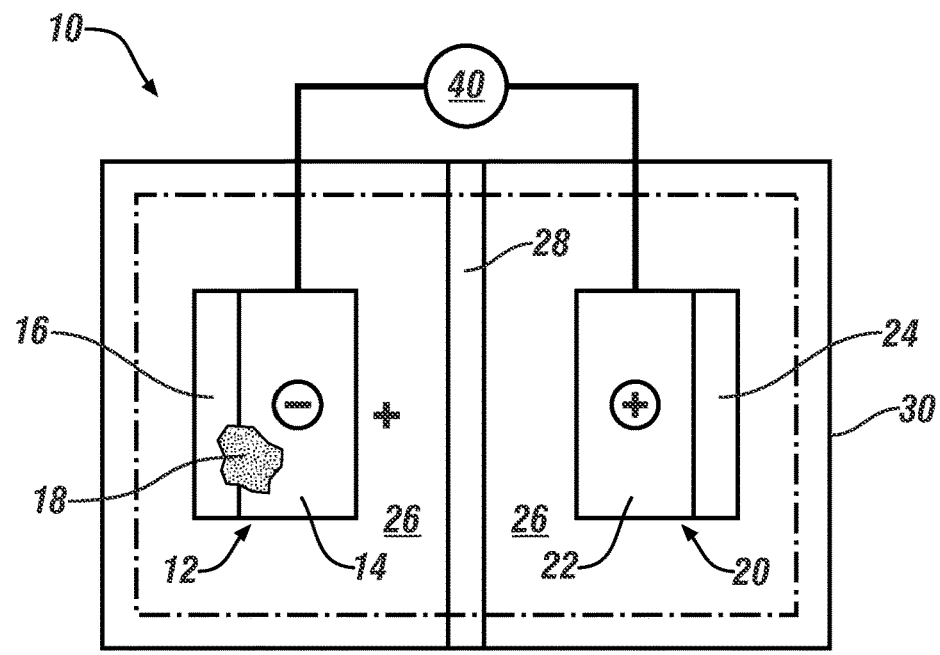
FIGS. 1 and 2 schematically illustrate a battery cell, in accordance with the disclosure.
Figure 2:
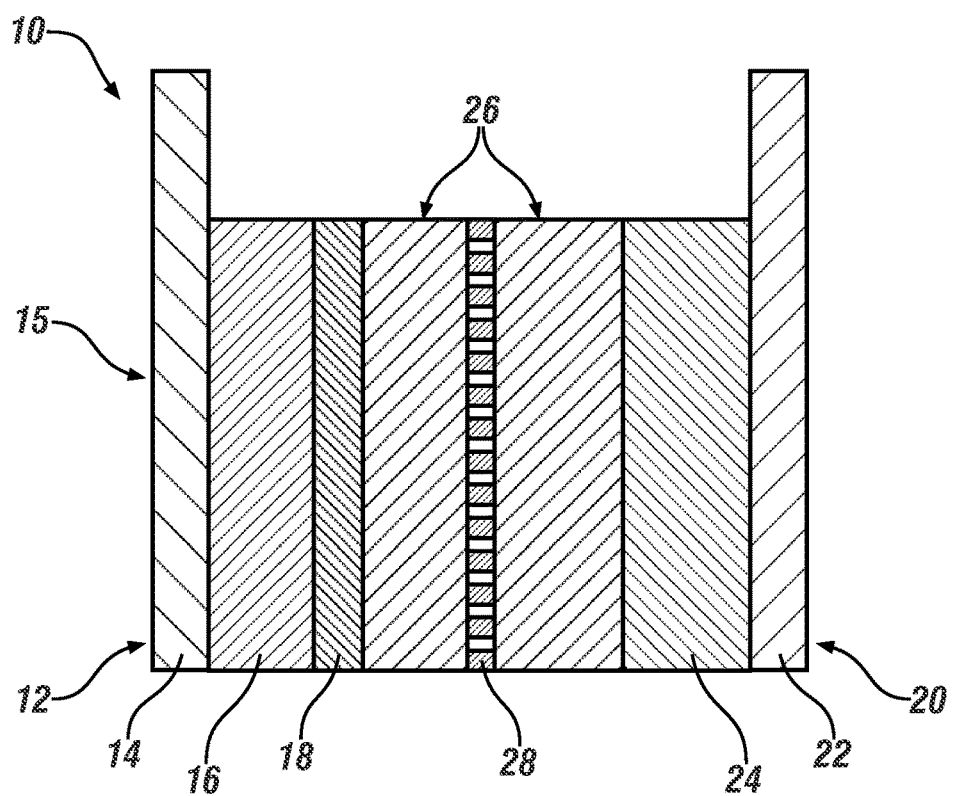

Referring now to the drawings, which are provided for the purpose of illustrating certain exemplary embodiments and not for the purpose of limiting the same, FIGS. 1 and 2 schematically illustrate a lithium-ion battery cell 10 that includes a cell anode 12, a cathode 20, a cell electrolyte 26 disposed between the cell anode 12 and the cathode 20, and a separator 28. The cell anode 12, cathode 20, and cell electrolyte 26 are encapsulated in a container 30, which may be a hard (e.g., metallic) case or soft (e.g., polymer) pouch, for example. The cell anode 12 and cathode 20 are situated on opposite sides of the separator 28, which is a microporous device fabricated from polymer or other material that is capable of conducting lithium ions and, in one embodiment, the cell electrolyte 26. The cell electrolyte 26 is a liquid electrolyte that includes one or more lithium salts dissolved in a non-aqueous solvent that has been specifically formulated and prepared for service in the lithium-ion battery cell 10. The cell anode 12 includes an anode current collector 14 with an electroactive material 16 applied thereon. The electroactive material 16 is a lithium intercalation host material in one embodiment. Details of forming the cell anode 12 are described with reference to FIG. 3. Cathode 20 includes a cathode current collector 22 with an active material 24 applied thereto. For example, the active material may be a lithium metal oxide active material. The active material 24 can store lithium ions at a higher electric potential than the electroactive material 16, for example. The anode current collector 14 and the cathode current collector 22 are connected by an interruptible external circuit 40 that allows an electric current to pass between the cell anode 12 and the cathode 20 to electrically balance migration of lithium ions.

As shown specifically with reference to FIG. 2, the anode current collector 14 includes the electroactive material 16, which is a carbon layer that is deposited on one face, with a solid electrolyte interface (SEI) layer 18 being formed thereon. The anode current collector 14 and the electroactive material 16 form a raw anode 15.

The raw anode 15 includes the anode current collector 14, which is fabricated from copper having a thickness of 4 um-25 um. The electroactive material 16 may be a single-sided layer (as shown) or a double-sided layer, wherein the layer(s) is 50 um-200 um thick. The electroactive material 16 is composed of active materials, binders, conductive additives and other additives. The raw anode 15 can be fabricated through slurry casting, dry processing or another electrode manufacturing process, without limitation.

The SEI layer 18 is formed on the raw anode 15 by sequentially applying a plurality of SEI-generating electrolytes to the electroactive material 16 of the raw anode 15 to form the cell anode 12. The cell anode 12 is assembled into the battery cell 10 after non-destructive quality testing. The process of sequentially applying a plurality of SEI-generating electrolytes to the electroactive material 16 of the raw anode 15 to form the cell anode 12 can include, in one embodiment, applying one SEI-generating electrolyte to the electroactive material 16 of the raw anode 15 multiple times, and removing the raw anode 15 during an interim period and, in some embodiments, removing residue and allowing the raw anode to rest and/or dry.

Alternatively, the process of sequentially applying a plurality of SEI-generating electrolytes to the electroactive material 16 of the raw anode 15 to form the cell anode 12 can include, in one embodiment, sequentially applying different SEI-generating electrolytes to the electroactive material 16 of the raw anode 15, removing the raw anode 15 during an interim period and, in some embodiments, removing residue and allowing the raw anode to rest and/or dry to avoid side reactions between the SEI-generating electrolytes, avoid cross-contamination of the later used SEI-generating electrolyte, and avoid dilution of the later-used SEI-generating electrolyte.

In this manner, the SEI layer 18 can be multi-layered with different compositions that are gradually grown onto the raw anode 15 at different amounts. Furthermore, formation of the SEI layer 18 may be accelerated by use of a specific SEI-generating electrolyte, e.g., a low viscosity electrolyte. Furthermore, a high viscosity electrolyte can be used to improve the formation of the SEI layer 18 but avoids the concerns related to wetting the separator 28. Furthermore, incompatible solvents and salts may be used in different steps of the SEI forming process 300 to obtain the optimum SEI quality. Furthermore, the cell electrolyte 26 that is selected for use in the battery cell can be specifically designed and tailored for battery cell operation, with a chemical composition that differs from the SEI-generating electrolyte(s).

The SEI-generating electrolytes can be one or more of non-aqueous liquid electrolyte solutions that include lithium salts and organic solvents. This includes one or multiple lithium salt(s) that are dissolved into one or a mixture of organic solvent(s). In certain variations, an aqueous solvent (i.e., a water-based solvent) or a hybrid solvent (e.g., a non-aqueous solvent system including at least 1 wt. % water) may also be used in the SEI-generating electrolyte.

Alternatively, other SEI-generating electrolytes, whether in liquid or gel form, capable of conducting lithium ions between the pre-SEI anodes and lithium source, may be employed.

Examples of lithium salts that may be employed include one or more of lithium hexafluorophosphate ($LiPF_6$); lithium perchlorate ($LiClO_4$); lithium tetrachloroaluminate ($LiAlCl_4$); lithium bis (oxalate)borate ($LiB(C_2O_4)_2$) (LiBOB); lithium nitrate ($LiNO_3$), lithium bis(trifluoromethanesulfonimide) (LITFSI) ($LiN(CF3SO2)2$); lithium fluorosulfonylimide ($LiN(FSO2)2$) (LIFSI), or others, without limitation.

Examples of organic solvents may include dimethyl ether, dimethyl carbonate (DMC), dimethoxyethane (DME, e.g., 1,2-dimethoxyethane)), 1-2-diethoxyethane, 1,3-dimethoxypropane (DMP), 2-methyltetrahydrofuran, ethylene carbonate (EC), propylene carbonate, butylene carbonate, diethyl carbonate, ethyl methyl carbonate (EMC), their combinations thereof, or others, without limitation. In certain variations, the SEI-generating electrolyte may include a solvent mixture as EC:DMC=1:1.

Figure 3:
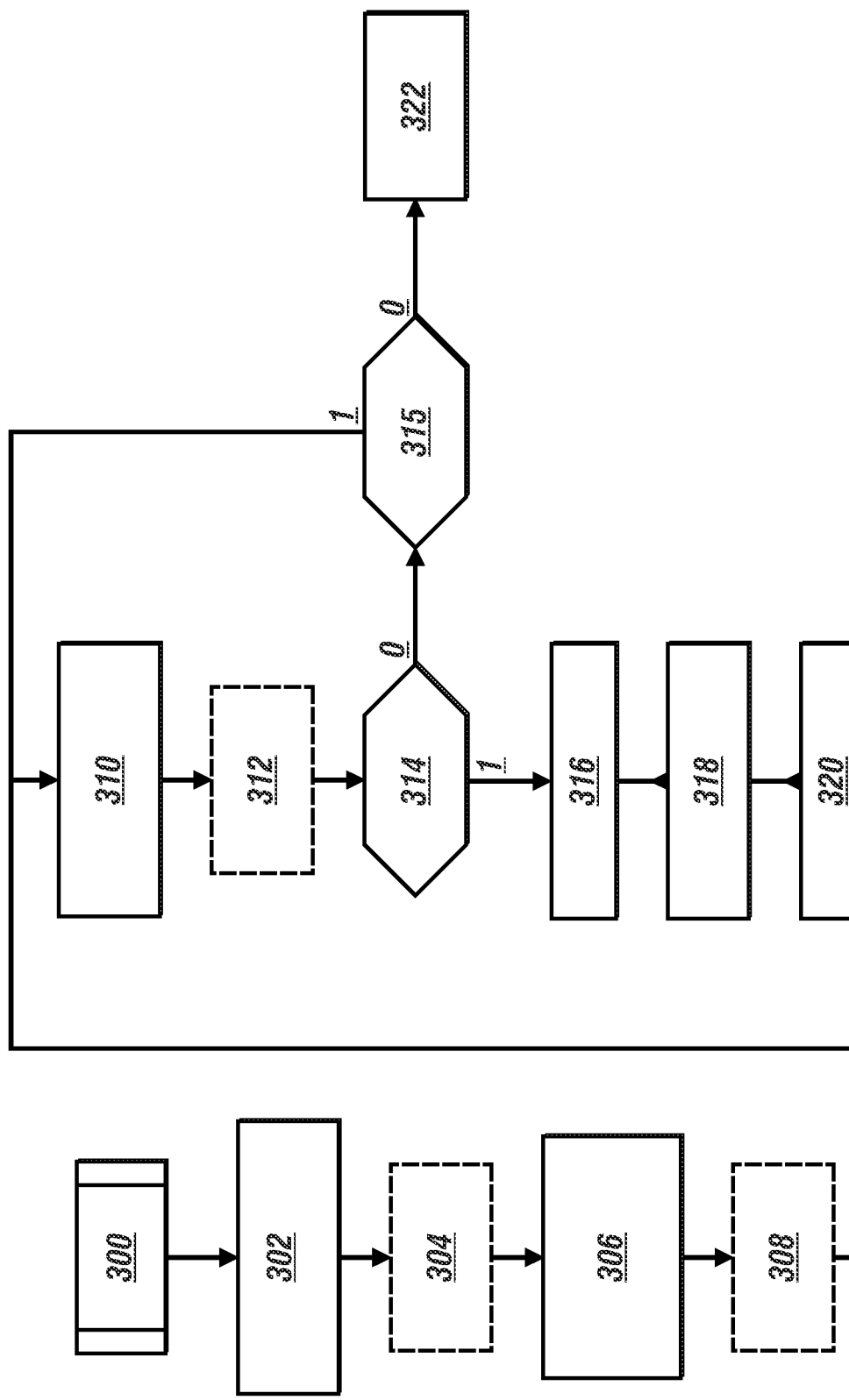

Referring now to FIGS. 3 and 4, with continued reference to the elements of FIGS. 1 and 2, one embodiment of an SEI forming process 300 is shown that illustrates a process for fabricating the cell anode 12 by forming the SEI layer 18 onto the raw anode 15 before assembling the cell anode 12 into the battery cell 10. The SEI layer 18 is formed on the electroactive material 16 of the raw anode 15. The SEI layer 18 is formed on the raw anode 15 by sequentially applying a plurality of SEI-generating electrolytes to the electroactive material 16 of the raw anode 15 (Steps 302 to 312). The resulting cell anode 12 that is created by forming the SEI layer 18 on the raw anode 15 is subjected to testing (Step 314), and then assembled into the battery cell (Step 316), wherein the battery cell includes a cathode, and a separator. The cell electrolyte 26 (also shown as element 404 in FIG. 4) is introduced into the battery cell (Step 318) prior to sealing (Step 320).

Fabricating the cell anode 12 for the lithium-ion battery cell 10 includes forming the solid electrolyte interface (SEI) layer 18 on the electroactive material 16 of the raw anode 15. This includes applying a first SEI-generating electrolyte 401 (shown in FIG. 4) onto the electroactive material 16 of the raw anode 15 (Step 302), thus forming a first intermediate anode, shown as element 411 in FIG. 4. The first SEI-generating electrolyte 401 is a first non-aqueous liquid electrolyte solution that includes a lithium salt or a mixture of lithium salts dissolved in an organic solvent. The first SEI-generating electrolyte can be applied to the electroactive material 16 of the raw anode 15 by spraying the first SEI-generating electrolyte onto the raw anode 15, immersing the raw anode 15 into a bath containing the first SEI-generating electrolyte 401 (as shown with reference to FIG. 4), brushing the first SEI-generating electrolyte onto the raw anode 15, or by another method.

The first intermediate anode 411 may be subjected to a post-processing step (step 304) to remove residue of the first SEI-generating electrolyte and/or to allow the first SEI-generating electrolyte to rest and/or dry. This is done under certain conditions to avoid side reactions between the first and second SEI-generating electrolytes, cross-contamination of the later used second SEI-generating electrolyte, and dilution of the later-used second SEI-generating electrolyte.

A second SEI-generating electrolyte 402 is applied onto the electroactive material 16 of the first intermediate anode (Step 306), thus forming a second intermediate anode, shown as element 412 in FIG. 4. The second SEI-generating electrolyte 402 is a second non-aqueous liquid electrolyte solution that includes a lithium salt or a mixture of lithium salts in an organic solvent. The second SEI-generating electrolyte is applied to the electroactive material 16 of the first intermediate anode 411 by spraying the second SEI-generating electrolyte onto the first intermediate anode, immersing the first intermediate anode into a bath containing the second SEI-generating electrolyte (as shown with reference to FIG. 4), brushing the second SEI-generating electrolyte onto the first intermediate anode, or another method.

The second intermediate anode 412 may be subjected to a post-processing step (step 308) to remove residue of the second SEI-generating electrolyte and/or to allow the second intermediate anode 412 to rest and/or dry. This is done under certain conditions to avoid side reactions between the second and third SEI-generating electrolytes, avoid cross-contamination of the later used third SEI-generating electrolyte, and avoid dilution of the later-used third SEI-generating electrolyte.

A third SEI-generating electrolyte 403 is applied onto the electroactive material 16 of the second intermediate anode (Step 310), thus forming a third intermediate anode, shown as element 413 in FIG. 4. The third SEI-generating electrolyte is a third non-aqueous liquid electrolyte solution that includes a lithium salt or a mixture of lithium salts in an organic solvent. The third SEI-generating electrolyte is applied to the electroactive material 16 of the second intermediate anode by spraying the third SEI-generating electrolyte onto the second intermediate anode, immersing the second intermediate anode into a bath containing the third SEI-generating electrolyte (as shown with reference to FIG. 4), brushing the third SEI-generating electrolyte onto the second intermediate anode, or another method.

The third intermediate anode 413 may be subjected to a post-processing step (step 312) to remove residue of the third SEI-generating electrolyte and/or to allow the third intermediate anode to rest and/or dry. This is done under certain conditions to avoid side reactions between the third and a subsequent electrolyte such as cell electrolyte 26, avoid cross-contamination of the later used electrolyte, and avoid dilution of the later-used electrolyte.

Other conditions associated with applying the first, second and third SEI-generating electrolytes include applying the respective first, second or third SEI-generating electrolyte in an inert environment at atmospheric pressure and a temperature within a range of 0 C-200 C, for a time period between 30 seconds up to 72 hours in one embodiment, with an applied potential of 0V-10V, an applied current having an areal current density on electrodes of 0-100 mA/cm$^2$, an applied surface pressure on the anode of 0.05 MPa to 30 MPa, depending upon application-related specifics of the respective first, second or third SEI-generating electrolyte.

The third intermediate anode 413 is subjected to non-destructive testing (step 314), which may be an x-ray fluorescent (XRF) spectroscopy analysis, an optical analysis in which a laser beam is scanned over the surface(s) of the third intermediate anode 312 while monitoring reflection and/or refraction, or another non-destructive test that can be used to evaluate quality parameters such as structural integrity of the SEI layer, consistency of the SEI layer on the surface, occurrence of defects in the SEI layer, thickness of the SEI layer, morphology of the SEI layer, etc., on the third intermediate anode 413 based thereon.

In-line quality analysis of the anode SEI can be employed to recognize defects in the SEI layer across the surface of the third intermediate anode 413 prior to cell assembly, and therefore improve yield rate before cell assembly. The quality of the SEI layer can be monitored in real-time, facilitating monitoring and adjustment to the SEI forming process 300.

When the testing indicates that the third intermediate anode 413 has not met corresponding requirements for structural integrity, consistency, occurrence of defects, thickness, morphology, etc. (314)(0), the results are analyzed (Step 315) to determine if the issue with the third intermediate anode can be addressed by reapplying the third SEI-generating electrolyte by repeating steps 310 and 312 (Step 315(1)), or if the third intermediate anode is to be removed from processing and recycled (Step 322).

When the testing indicates that the third intermediate anode has met the requirements (314)(1), the third intermediate anode becomes the cell anode, which indicated as element 414 in FIG. 4. The cell anode 414 is assembled into the cell pack (Step 316), wherein the cell pack includes the cathode 416 and the separator 415. Another electrolyte 404, i.e., the cell electrolyte 26 described with reference to FIG. 1, is introduced to the cell pack (Step 318) and the cell pack is sealed (Step 320). The cell pack in FIG. 4 also shows a second anode 418, a second cathode 420, and a second separator 417, which are completely separated by separator 430, which are illustrated to indicate that two or multiple layers of cells with anodes, cathodes, and separators can be incorporated into a finished battery cell pack.

SEI formation is a complicated but critical process in cell manufacturing. SEI is formed on anodes and highly determines cell performance. Electrolyte composition has a dominant role in SEI formation. By preparing the cell anode and forming the SEI layer in the manner described herein, partially-wetted electrodes and under-controlled reaction kinetics inside the battery cell during high-rate SEI formation that may lead to lithium plating, electrolyte decomposition and gassing, and other battery cell quality concerns caused by in-cell SEI formation are reduced or avoided.

The various electrolytes can be formulated and selected based upon application. This includes selecting the SEI-generating electrolyte(s) specifically to form the SEI layer 18 on the raw anode prior to assembly of the anode in the battery cell, and selecting the cell electrolyte 26 specifically for in-use electrochemical service after assembly of the anode in the battery cell.

The SEI layer can be formed onto anodes (1-side or double-side coated) before cell assembly without reaction limitations that may otherwise be imposed by the cathode or the cell lamination structure.

In this manner, formation of the SEI layer can be individually designed and conducted on anodes for optimizing conditioning and cell performance.

In this manner, reactions related to formation of the SEI layer are primarily completed outside of the assembled battery cell, with the formation of the SEI layer being achieved with a more accurate reaction control and with less limitations on reaction kinetics due to the lamination structure in cells. While formation of the SEI layer is done in a layered cell structure, there may exist a lot of inhomogeneity along electrode surface and among electrodes that locates in different layers in the cell, which is undesirable.

In this manner, the in-line quality monitoring can recognize defects in the SEI layer prior to assembly of the anode into the battery cell and therefore improve yield rate before and after cell assembly.

Quality of the SEI layer can be directly monitored at during cell manufacturing with non-destructive and non-contact diagnosis methods. Formation of the SEI layer on the anode can be monitored at different locations on the same anode or among different anodes located in the same cell to provide consistent quality of SEI formation. Multiple SEI-generating electrolyte systems can be used during formation of the SEI layer to obtain a gradual growth of the SEI layer. Different SEI-generating electrolyte systems can be designed and used, separately, for formation of the SEI layers on anodes and for long-term operating in cells.

Furthermore, SEI-generating electrolytes that are not compatible with cathode chemistries can be used during formation of the SEI layer. The formation of the SEI layer on the anode is not affected by a condition of a cathode, such as slow or improper wetting, limited lithium amount, and diffusion limitations on electron, heat and gas. In this manner, cell-degassing and aging can primarily occur prior to the battery cell assembly step, thus avoiding in-cell gas release that may occur and providing appropriate electrolyte exposure during reactions.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A method for fabricating a cell anode for a lithium ion battery cell, the method comprising:
   forming a solid electrolyte interface (SEI) layer on a raw anode, including:
   applying a first SEI-generating electrolyte to the raw anode to form a first intermediate anode;
   applying a second SEI-generating electrolyte to the first intermediate anode to form a second intermediate anode;
   post-processing the first intermediate anode to avoid a side reaction between the first SEI-generating electrolyte and the second SEI-generating electrolyte, cross-contamination of the second SEI-generating electrolyte, and dilution of the second SEI-generating electrolyte;
   applying a third SEI-generating electrolyte to the second intermediate anode to form the cell anode;
   post-processing the second intermediate anode to avoid a side reaction between the second SEI-generating electrolyte and the third SEI-generating electrolyte, cross-contamination of the third SEI-generating electrolyte, and dilution of the third SEI-generating electrolyte;
wherein applying the respective first, second, and third SEI-generating electrolyte occurs in an inert environment at atmospheric pressure at a temperature of from 0° C. to 200° C. for a time period of from 30 seconds to 72 hours with an applied potential of from 0V to 10V, an applied current having an areal current density of from 0 mA/cm$^2$ to 100 mA/cm$^2$, and an applied surface pressure on the respective raw anode, first intermediate anode, and second intermediate anode of from 0.05 MPa to 30 MPa;
concurrent to applying the third SEI-generating electrolyte, monitoring the cell anode with non-destructive testing in real-time to identify either: a) an acceptable quality of the third SEI-generating electrolyte to thereby form the SEI layer on the raw anode or b) a defect in at least one of structural integrity, consistency, thickness, and morphology of the third SEI-generating electrolyte; and
after identifying the defect, i) reapplying the third SEI-generating electrolyte to thereby form the SEI layer on the raw anode or ii) recycling the cell anode;
wherein the cell anode includes the raw anode having the SEI layer; and
wherein the raw anode includes a metallic strip having an electroactive material deposited on at least one side.

2. The method of claim 1, wherein applying the first SEI-generating electrolyte to the raw anode comprises applying a first non-aqueous liquid electrolyte that includes a first lithium salt that is dissolved in an organic solvent to the raw anode.

3. The method of claim 2, wherein the first SEI-generating electrolyte comprises a non-aqueous liquid electrolyte solution that includes a lithium salt that is dissolved in an organic solvent, wherein the lithium salt comprises one of lithium hexafluorophosphate, lithium perchlorate, lithium tetrachloroaluminate, lithium bis (oxalate)borate, lithium nitrate, lithium bis(trifluoromethanesulfonimide), or lithium fluorosulfonylimide.

4. The method of claim 1, wherein applying the first SEI-generating electrolyte to the raw anode comprises applying a first non-aqueous liquid electrolyte solution that includes a first mixture of lithium salts that are dissolved in an organic solvent to the raw anode.

5. The method of claim 1, wherein applying the second SEI-generating electrolyte to the first intermediate anode comprises applying a second non-aqueous liquid electrolyte solution that includes a second lithium salt that is dissolved in an organic solvent to the first intermediate anode.

6. The method of claim 5, wherein the second SEI-generating electrolyte comprises a non-aqueous liquid electrolyte solution that includes a lithium salt that is dissolved in an organic solvent, wherein the lithium salt comprises one of lithium hexafluorophosphate, lithium perchlorate, lithium tetrachloroaluminate, lithium bis (oxalate)borate, lithium nitrate, lithium bis(trifluoromethanesulfonimide), or lithium fluorosulfonylimide.

7. The method of claim 1, wherein applying the SEI-generating electrolyte to the first intermediate anode comprises applying a second non-aqueous liquid electrolyte solution that includes a second mixture of lithium salts that are dissolved in an organic solvent to the first intermediate anode.

8. The method of claim 1, wherein applying the third SEI-generating electrolyte to the second intermediate anode comprises applying a third non-aqueous liquid electrolyte solution that includes a third lithium salt that is dissolved in an organic solvent to the second intermediate anode.

9. The method of claim 8, wherein the third SEI-generating electrolyte comprises a non-aqueous liquid electrolyte solution that includes a lithium salt that is dissolved in an organic solvent, wherein the lithium salt comprises one of lithium hexafluorophosphate, lithium perchlorate, lithium tetrachloroaluminate, lithium bis (oxalate)borate, lithium nitrate, lithium bis(trifluoromethanesulfonimide), or lithium fluorosulfonylimide.

10. The method of claim 1, wherein applying the third SEI-generating electrolyte to the second intermediate anode comprises applying a third non-aqueous liquid electrolyte solution that includes a third mixture of lithium salts that are dissolved in an organic solvent to the second intermediate anode.

11. The method of claim 1, further comprising:
executing a first drying step subsequent to applying the first SEI-generating electrolyte to the raw anode;
executing a second drying step subsequent to applying the second SEI-generating electrolyte to the first intermediate anode; and
executing a third drying step subsequent to applying the third SEI-generating electrolyte to the second intermediate anode.

12. The method of claim 1, further comprising:
assembling the cell anode into a cell pack, wherein the cell pack includes a cathode, and a separator; and
adding a cell electrolyte to the cell pack prior to sealing, wherein the cell electrolyte has a chemical composition that differs from the first, second, and third SEI-generating electrolytes.

13. A method for fabricating a lithium ion battery cell, the method comprising:
fabricating a cell anode, including:
sequentially applying an SEI-generating electrolyte to a raw anode to form a cell anode having a solid electrolyte interface (SEI) layer that includes a plurality of layers formed from the SEI-generating electrolyte;
wherein sequentially applying the SEI-generating electrolyte occurs in an inert environment at atmospheric pressure at a temperature of from 0° C. to 200° C. for a time period of from 30 seconds to 72 hours with an applied potential of from 0V to 10V, an applied current having an areal current density of from 0 mA/cm$^2$ to 100 mA/cm$^2$, and an applied surface pressure on the raw anode of from 0.05 MPa to 30 MPa;
post-processing the cell anode to avoid a side reaction between the plurality of layers formed from the SEI-generating electrolyte, cross-contamination of the plurality of layers formed from the SEI-generating electrolyte, and dilution of the SEI-generating electrolyte;
concurrent to sequentially applying the SEI-generating electrolyte, monitoring the cell anode with non-destructive testing in real-time to identify either: a) an acceptable quality of the plurality of layers formed from the SEI-generating electrolyte to thereby form the cell anode or b) a defect in at least one of structural integrity, consistency, thickness, and morphology of at least one of the plurality of layers formed from the SEI-generating electrolyte;

after identifying the defect, i) reapplying the SEI-generating electrolyte to thereby form the SEI layer on the raw anode or ii) recycling the cell anode;

after monitoring, assembling the cell anode into a cell pack, wherein the cell pack includes a cathode and a separator; and adding a cell electrolyte to the cell pack, wherein the cell electrolyte has a chemical composition that differs from the SEI-generating electrolyte; and after adding the cell electrolyte, sealing the cell pack to thereby fabricate the lithium ion battery cell.

14. The method of claim 13,
wherein assembling the cell anode into the cell pack occurs only when the SEI layer achieves a minimum standard.

15. The method of claim 13, wherein sequentially applying the SEI-generating electrolyte to the raw anode comprises applying a non-aqueous liquid electrolyte solution that includes a lithium salt that is dissolved in an organic solvent to the raw anode.

16. The method of claim 13, wherein sequentially applying the SEI-generating electrolyte to the raw anode comprises applying a non-aqueous liquid electrolyte solution that includes a mixture of lithium salts that are dissolved in an organic solvent.

17. The method of claim 13, wherein sequentially applying the SEI-generating electrolyte to the raw anode comprises applying a non-aqueous liquid electrolyte solution that includes a lithium salt that is dissolved in a mixture of organic solvents to the raw anode.

18. The method of claim 13, wherein sequentially applying the SEI-generating electrolyte to the raw anode comprises applying a non-aqueous liquid electrolyte solution that includes a plurality of lithium salts that are dissolved in a mixture of organic solvents to the raw anode.

19. The method of claim 13, wherein sequentially applying the SEI-generating electrolyte to the raw anode comprises applying a non-aqueous liquid electrolyte solution that includes one of lithium hexafluorophosphate, lithium perchlorate, lithium tetrachloroaluminate, lithium bis (oxalate)borate, lithium nitrate, lithium bis(trifluoromethanesulfonimide), or lithium fluorosulfonylimide that is dissolved in an organic solvent.

20. The method of claim 13, further comprising executing a drying step subsequent to each sequential applying of the SEI-generating electrolyte.

* * * * *